United States Patent
Balakrishnan

(10) Patent No.: US 11,989,457 B2
(45) Date of Patent: May 21, 2024

(54) SYSTEM AND METHOD FOR PERFORMING DATA READ-WRITE OPERATIONS IN ZONED STORAGE DEVICES

(71) Applicant: SAMSUNG ELECTRONICS CO., LTD., Suwon-si (KR)

(72) Inventor: Rakesh Balakrishnan, Karnataka (IN)

(73) Assignee: Samsung Electronics Co., Ltd. (KR)

(*) Notice: Subject to any disclaimer, the term of this patent is extended or adjusted under 35 U.S.C. 154(b) by 37 days.

(21) Appl. No.: 17/835,759

(22) Filed: Jun. 8, 2022

(65) Prior Publication Data

US 2023/0325119 A1 Oct. 12, 2023

(30) Foreign Application Priority Data

Mar. 24, 2022 (IN) .............................. 202241016685

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0619* (2013.01); *G06F 3/0656* (2013.01); *G06F 3/067* (2013.01)

(58) Field of Classification Search
CPC .... G06F 3/0659; G06F 3/0604; G06F 3/0619; G06F 3/0656; G06F 3/067

USPC .......................................................... 711/154
See application file for complete search history.

(56) References Cited

U.S. PATENT DOCUMENTS

| | | | |
|---|---|---|---|
| 11,422,726 B1* | 8/2022 | Jo | G06F 3/067 |
| 2017/0220264 A1* | 8/2017 | Sokolov | G06F 3/061 |
| 2020/0089407 A1 | 3/2020 | Baca et al. | |
| 2021/0406185 A1 | 12/2021 | Guda et al. | |

FOREIGN PATENT DOCUMENTS

EP 3 748 509 A1 12/2020

OTHER PUBLICATIONS

European Search Report dated Nov. 22, 2022 Cited in Corresponding European Application No. EP 22 176 932.6.

\* cited by examiner

*Primary Examiner* — Mardochee Chery
(74) *Attorney, Agent, or Firm* — Fish & Richardson P.C.

(57) ABSTRACT

A method for performing a data read-write operation across multiple zoned storage devices includes reading data from at least one zone of a source zoned storage device and sequentially writing the read data to at least one zone of a destination zoned storage device, where the source zoned storage device is different from the destination zoned storage device.

10 Claims, 9 Drawing Sheets

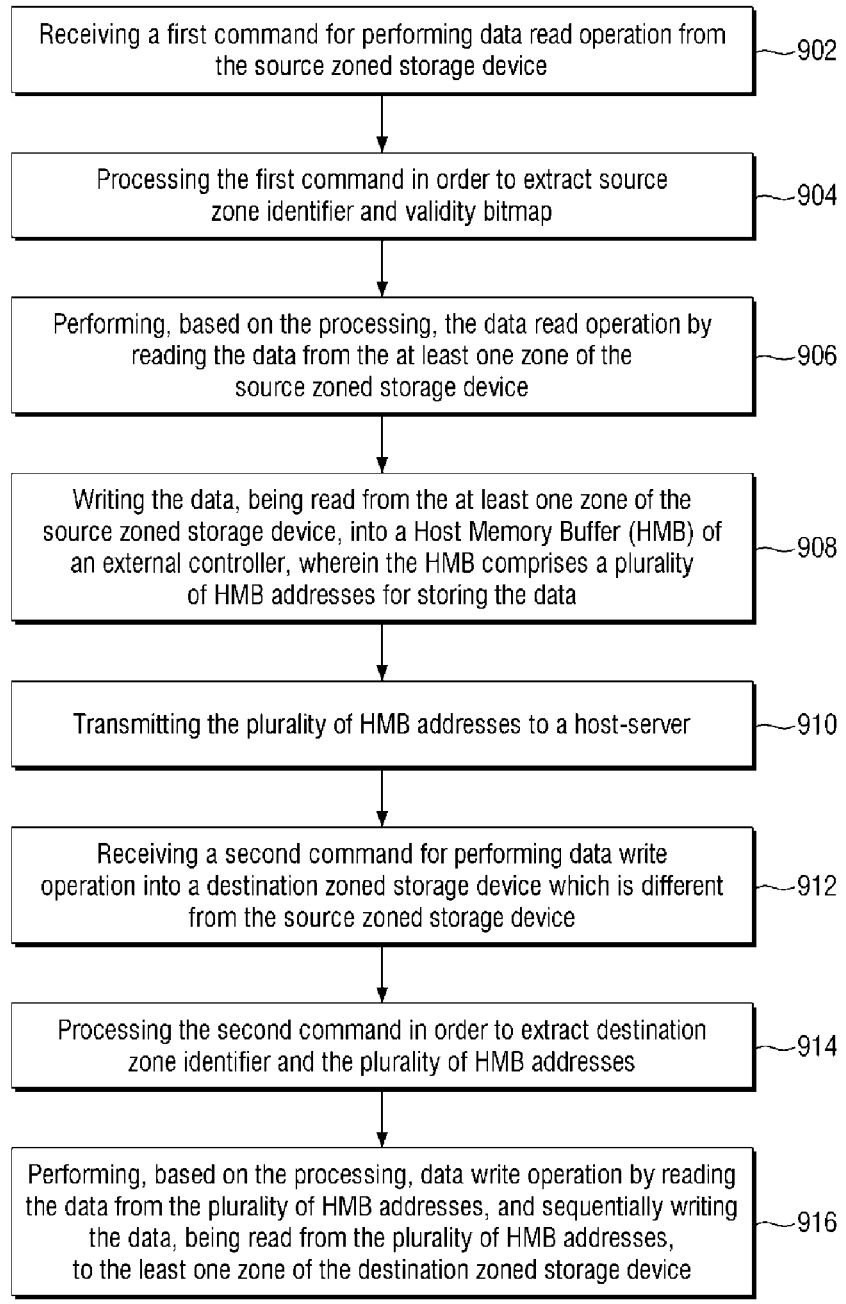

SYSTEM AND METHOD FOR PERFORMING DATA READ-WRITE OPERATIONS IN ZONED STORAGE DEVICES

CROSS-REFERENCE TO RELATED APPLICATIONS

This U.S. non-provisional patent application claims priority under 35 U.S.C. § 119 to Indian Patent Application No. 202241016685, filed on Mar. 24, 2022, in the Indian Patent Office, the entire contents of which are hereby incorporated by reference.

TECHNICAL FIELD

The present disclosure generally relates to zoned storage devices. Particularly, the present disclosure relates to a method and system for performing data read-write operations in the zoned storage devices.

BACKGROUND

With the advancements of technology, data growth has been exploding with time and storage service providers are struggling to manage the ever growing demand of data. It is predicted that in coming years machines, industries, organizations, corporates etc. will be generating hundreds or thousands zettabytes of data per year. For example, huge amounts of data will be generated from Internet of Things (IoT), sensors, digital systems, 5G implementation, data analytics, and self-driving cars. Storing and managing this huge amount of data will be a challenging task for the service providers (specially for data center service providers).

A datacenter may include a plurality of components including computing devices (e.g., processors/controllers/servers etc.), security systems, network equipment, data storage systems, management systems, power equipment, etc. Data storage systems may comprise devices and software that enable storage of data within a data center facility. The data storage systems may include storage devices including hard disk drives (HDD), solid state drives (SSD), tape drives, and other internal and external storages. HDDs and SSDs are the primarily forms of storage devices used in the data centers.

To keep up with a growing amount of data, storage device manufacturers continue to increase bit density of storage devices used in datacenters (i.e., HDDs and SSDs). However, increasing the bit density is not enough for the zettabyte age and further improvements in data storage infrastructure are needed. For example, there is a need for innovative techniques that can keep pace with growing data demands while lowering total cost of ownership (TCO).

One such innovative technique is Zoned Storage which allows data to be sequentially stored in independent zones within a Zoned Storage device based on usage and access frequency of the data. For HDDs, the Zoned Storage technology is called Shingled Magnetic Recording (SMR) or SMR HDDs. For SSDs, the Zoned Storage technology is called zoned namespaces (ZNS) or ZNS SSDs. Zoned Storage technology adds new commands that allow a host to work with zones and take at least some responsibility for data placement within zones.

The Zoned Storage technology has some limitations and one such limitation is handling data read-write operations across multiple Zoned Storage devices. For example, a command called Zone Copy has been introduced for copying data from one zone to another zone. However, currently the Zoned Storage technology has a restriction of zone copy or data copy within a single storage device only. And sometimes scattering of data across multiple zoned storage devices is desirable, which is not possible in current Zoned Storage technology. For example, to avoid data loss due to failure of a single storage device, it is desirable to scatter data across multiple zoned storage devices.

Thus, with the huge and rapidly growing amount of data, there exists a need for further improvements in the existing Zoned Storage technology.

SUMMARY

One or more shortcomings discussed above may be overcome and additional advantages may be provided by the present disclosure.

An object of the present disclosure is to perform data read-write operations across multiple zoned storage devices.

Another object of the present disclosure is to provide efficient techniques for drive to drive data transfer within an enclosure in a Zoned Namespaces (ZNS) environment.

Another objective of the present disclosure is to avoid data loss due to failure of one or more storage devices within the ZNS environment.

According to an aspect of the present disclosure, methods, apparatus, and computer readable media are provided for performing data read-write operation in zoned storage devices.

In a non-limiting embodiment of the present disclosure, the present application discloses a method of performing a data read-write operation in zoned storage devices. The method comprises reading data from at least one zone of a source zoned storage device and sequentially writing the read data to at least one zone of a destination zoned storage device, where the source zoned storage device is different from the destination zoned storage device.

In another non-limiting embodiment of the present disclosure, the present application discloses a method of performing a data read-write operation among a plurality of zoned storage devices by using an external controller. The method comprises receiving a command for performing the data read-write operation among the plurality of zoned storage devices and processing the command to extract a source zone identifier, a validity bitmap, and a destination zone identifier. The source zone identifier comprises information about at least one zone from which data is to be read from a source zoned storage device of the plurality of zoned storage devices, the validity bitmap comprises information about the data which is to be read from the source zoned storage device, and the destination zone identifier comprises information about at least one zone to which the data is to be written into a destination zoned storage device of the plurality of zoned storage devices. The source zoned storage device is different from the destination zoned storage device. The method further comprises performing, based on the processing, the data read-write operation by reading the data from the at least one zone of the source zoned storage device and sequentially writing the data to the at least one zone of the destination zoned storage device.

In another non-limiting embodiment of the present disclosure, the present application discloses a method of performing a data read-write operation among a plurality of zoned storage devices. The method comprises providing a source device processor, locally placed within a source zoned storage device, for receiving a first command for performing a data read operation on the source zoned storage device and processing the first command to extract a source zone identifier and a validity bitmap. The source zone identifier comprises information about at least one zone from which data is to be read from the source zoned storage device, and the validity bitmap comprises information about the data which is to be read from the source zoned storage device. The method further comprises providing the source device processor for performing, based on the processing, the data read operation by reading the data from the at least one zone of the source zoned storage device and writing the data, being read from the at least one zone of the source zoned storage device, into a Host Memory Buffer (HMB). The HMB comprises a plurality of HMB addresses for storing the data. The method further comprises providing the source device processor for transmitting the plurality of HMB addresses to a host-server.

The method further comprises providing a destination device processor, locally placed within a destination zoned storage device, for: (1) receiving a second command for performing a data write operation in the destination zoned storage device which is different from the source zoned storage device; (2) processing the second command to extract destination zone identifier and the plurality of HMB addresses, where the destination zone identifier comprises information about at least one zone to which the data is to be written in the destination zoned storage device; and (3) performing, based on the processing, the data write operation. Performing the data write operation comprises reading the data from the plurality of HMB addresses and sequentially writing the data, being read from the plurality of HMB addresses, to the at least one zone of the destination zoned storage device.

In another non-limiting embodiment of the present disclosure, the present application discloses an apparatus for performing a data read-write operation in zoned storage devices. The apparatus comprises a memory and a processor communicatively coupled with the memory. The processor is configured to read data from at least one zone of a source zoned storage device and sequentially write the read data to at least one zone of a destination zoned storage device. The source zoned storage device is different from the destination zoned storage device.

In another non-limiting embodiment of the present disclosure, the present application discloses an apparatus for performing a data read-write operation among a plurality of zoned storage devices. The apparatus comprises a memory and a processor communicatively coupled with the memory. The processor is configured to receive a command for performing the data read-write operation among the plurality of zoned storage devices and process the command to extract a source zone identifier, a validity bitmap, and a destination zone identifier. The source zone identifier comprises information about at least one zone from which data is to be read from a source zoned storage device of the plurality of zoned storage devices, the validity bitmap comprises information about the data which is to be read from the source zoned storage device, and the destination zone identifier comprises information about at least one zone to which the data is to be written, after being read, into a destination zoned storage device of the plurality of zoned storage devices. The source zoned storage device is different from the destination zoned storage device. The processor is further configured to perform, based on the processing, the data read-write operation by reading the data from the at least one zone of the source zoned storage device and sequentially writing the data to the at least one zone of the destination zoned storage device.

In another non-limiting embodiment of the present disclosure, the present application discloses a system for performing a data read-write operation among a plurality of zoned storage devices. The system comprises a source device processor locally placed within a source zoned storage device and a destination device processor locally placed within a destination zoned storage device. The source device processor is configured to receive a first command for performing a data read operation on the source zoned storage device and process the first command to extract a source zone identifier and a validity bitmap. The source zone identifier comprises information about at least one zone from which data is to be read from the source zoned storage device, and the validity bitmap comprises information about the data which is to be read from the source zoned storage device. The source device processor is further configured to perform, based on the processing, the data read operation by reading the data from the at least one zone of the source zoned storage device and write the data, being read from the at least one zone of the source zoned storage device, into a Host Memory Buffer (HMB). The HMB comprises a plurality of HMB addresses for storing the data. The source device processor is further configured to transmit the plurality of HMB addresses to a host-server.

The destination device processor is configured to receive a second command for performing a data write operation in the destination zoned storage device, which is different from the source zoned storage device, and process the second command to extract a destination zone identifier and the plurality of HMB addresses. The destination zone identifier comprises information about at least one zone to which the data is to be written in the destination zoned storage device. The destination device processor is further configured to perform, based on the processing, the data write operation by reading the data from the plurality of HMB addresses and sequentially writing the data, being read from the plurality of HMB addresses, in the at least one zone of the destination zoned storage device.

In another non-limiting embodiment of the present disclosure, the present application discloses a non-transitory computer-readable medium storing instructions executable by a processor to cause the processor to read data from at least one zone of a source zoned storage device and sequentially write the data to at least one zone of a destination zoned storage device. The source zoned storage device is different from the destination zoned storage device.

In another non-limiting embodiment of the present disclosure, the present application discloses a non-transitory computer-readable medium storing instructions executable by a processor to cause the processor to receive a command for performing the data read-write operation among a plurality of zoned storage devices and process the command to extract a source zone identifier, a validity bitmap, and a destination zone identifier. The source zone identifier comprises information about at least one zone from which data is to be read from a source zoned storage device of the plurality of zoned storage devices. The validity bitmap comprises information about the data which is to be read from the source zoned storage device. The destination zone identifier comprises information about at least one zone to which the data is to be written, after being read, in a destination zoned storage device of the plurality of zoned storage devices. The source zoned storage device is different from the destination zoned storage device. The instructions further cause the processor to perform, based on the processing, the data read-write operation by reading the data from the at least one zone of the source zoned storage device and sequentially writing the data to the at least one zone of the destination zoned storage device.

In another non-limiting embodiment of the present disclosure, the present application discloses a non-transitory computer-readable medium storing instructions for performing a data read-write operation in zoned storage devices. The instructions comprising instructions for causing a source device processor, locally placed within a source zoned storage device, to receive a first command for performing the data read operation on the source zoned storage device and process the first command to extract a source zone identifier and a validity bitmap. The source zone identifier comprises information about at least one zone from which data is to be read from the source zoned storage device. The validity bitmap comprises information about the data which is to be read from the source zoned storage device. The instructions further cause the source device processor to perform, based on the processing, the data read operation by reading the data from the at least one zone of the source zoned storage device and write the data, being read from the at least one zone of the source zoned storage device, in a Host Memory Buffer (HMB). The HMB comprises a plurality of HMB addresses for storing the data. The instructions further cause the source device processor to transmit the plurality of HMB addresses to a host-server.

The instructions comprising instructions for causing a destination device processor, locally placed within a destination zoned storage device, to receive a second command for performing a data write operation in the destination zoned storage device which is different from the source zoned storage device and process the second command to extract a destination zone identifier and the plurality of HMB addresses. The destination zone identifier comprises information about at least one zone to which the data is to be written in the destination zoned storage device. The instructions further cause the destination device processor to perform, based on the processing, the data write operation by reading the data from the plurality of HMB addresses and sequentially writing the data, being read from the plurality of HMB addresses, in the at least one zone of the destination zoned storage device.

The present disclosure provides techniques of extending zone copy (i.e., handling data read-write operations) across multiple zoned storage devices. Thus, the present disclosure facilitates an efficient zone copy across multiple zoned storage devices in a data center facility (i.e., enables efficient drive to drive data transfer).

BRIEF DESCRIPTION OF DRAWINGS

Further aspects and advantages of the present disclosure will be readily understood from the following detailed description with reference to the accompanying drawings. Reference numerals have been used to refer to identical or functionally similar elements. The figures together with a detailed description below are incorporated in and form part of the specification and serve to further illustrate the embodiments and explain various principles and advantages, in accordance with the present disclosure wherein:

FIG. 9 depicts a flowchart illustrating another method for performing a data read-write operation across zoned storage devices, in accordance with some embodiments of the present disclosure.

Figure 1A:
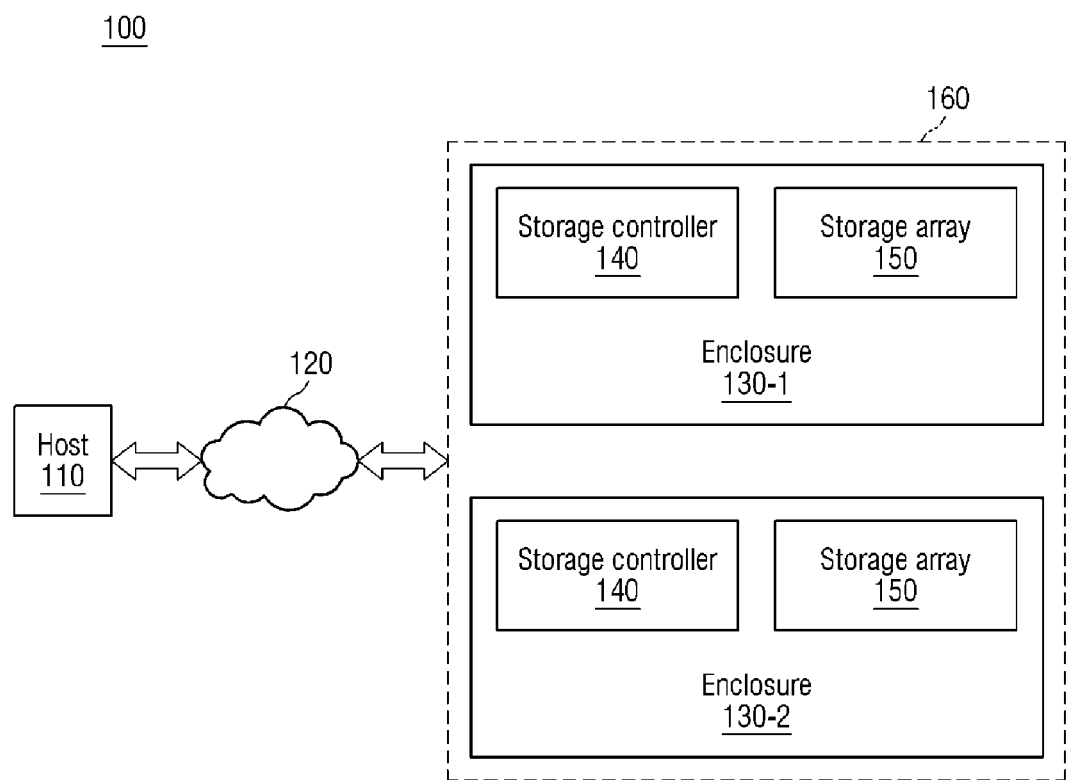
FIG. 1A shows an exemplary storage system for performing data read-write operation across zoned storage devices, in accordance with some embodiments of the present disclosure.

It should be appreciated by those skilled in the art that any block diagrams herein represent conceptual views of the illustrative systems embodying the principles of the present disclosure. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

Zoned Storage technology involves organizing or partitioning an available storage space into zones where each zone can be read in any order but must be written sequentially. Hence, Zoned storage devices are a class of storage devices with an address space that is divided into zones which have write constraints different from regular storage devices. Zoned Storage technologies which are popular nowadays are Shingled Magnetic Recording (SMR) for HDDs and Zoned Namespaces (ZNS) for SSDs.

A zone may refer to a storage space comprising a set of memory cells or "blocks" that are written sequentially. Thus, a zone comprises a plurality of blocks. In the present disclosure, a "write once" storage device refers to a storage media that is erased each time new data is written on it.

Zoned Namespace (ZNS) is a standard in storage management, in which the storage device is restricted to write exclusively in sequential order within zones. ZNS divides a namespace or storage space into a plurality of zones. In the present disclosure, drive to drive data transfer/copy refers to transferring/copying of data from one zoned storage drive to another zoned storage drive within an enclosure.

As discussed in the background section, data storage devices/drives in a data center facility mainly comprise hard disk drives (HDDs) and solid state drives (SSDs). An HDD is a non-volatile data storage device that is made up of moving mechanical parts (e.g., spindle, rotating platters, controller, actuator, read/write heads etc.). Data is stored in the HDD using magnetic recording technology. Depending on the type of magnetic recording method used, the HDD may be classified mainly into a conventional magnetic recording (CMR) HDD and a shingled magnetic recording (SMR) HDD.

In the CMR drives, data is written onto magnetic tracks that are laid "side-by-side" and are spaced apart from each other using small gaps so that the tracks do not overlap. In case of SMR drives, the data is written sequentially onto a track which is then "partially overlapped" with another track of data, creating a pattern similar to shingles on a roof. SMR technology removes the gaps between tracks by sequentially writing tracks in an overlapping manner, thereby allowing more data tracks to be written, and hence increasing storage capacity. The overlapping tracks may be grouped into zones for more effective data management. The write head designed for SMR drives is wider than required for a single track of data. Small gaps may be provided between successive zones to prevent data overwrite by the wide write head from one zone to another.

The SMR HDDs are based on the Zoned Storage technology. In SMR HDDs, the data is organized and written sequentially. Thus, if a particular portion of data in a zone needs to be modified or re-written, that entire zone must be re-written. Because the modified data portion is potentially under another track/shingle of data, direct modification is not permitted, unlike CMR HDD. However, the SMR HDDs provide random-read capability, allowing rapid data access like CMR HDDs.

A command interface of SMR HDDs can take different forms including: device-managed SMR, host-managed SMR, and host aware SMR, where each form is designed for different applications and use cases. Host-managed SMR HDDs are mainly built for data centers and allow for optimized performance and intelligent data placement. Zoned Device ATA Command Set (ZAC) and Zoned Block Command (ZBC) standards describe a set of commands necessary for a host application to manage zones of the host managed or host aware SMR.

A solid-state drive (SSD) is also a non-volatile data storage device that uses flash-based memory or semiconductor chips to store data. Since SSD comprises no or fewer moving parts, it is much faster than the HDD. Due to high read/write speed and faster boot time, SSDs can easily replace HDDs in many applications. However, the flash-based SSDs have certain limitations such as they allow data to be written sequentially; they must be erased first before being re-written; and they support only a limited number of write operations in their lifetime.

Conventionally, a host server writes data to the SSD and a controller of the SSD decides where that data should be written in the SSD. When an SSD has free space, the host is free to write data to the SSD and the controller can decide which block should store that data. Consider a situation where the host asks to delete data in a first half portion of a fully occupied data block and keep the data in a second half of the block. The controller cannot simply erase the data from first half because the erase operation can only be performed on the whole block and doing this would also erase the data in the second half. Thus, to erase the complete block, the data in the second half has to be re-written to an entirely different block. This re-writing is termed as Write Amplification. Since the SSD supports only a limited number of re-write cycles, the re-writing effectively shortens the life of the SSD. The erasing of data may be termed as garbage collection (GC). The conventional SSDs must be over-provisioned for garbage collection. Over-provisioning comprises providing additional data storage space needed to move data during garbage collection.

To solve some or all of the above-identified problems, the NVMe Technical Work Group is developing Zoned Storage Technology. Non-Volatile Memory Express (NVMe) is a storage protocol which was developed to improve the performance of SSDs. In the NVMe protocol, a namespace is a collection of logical block addresses (LBA) accessible to the host. The ZNS technology allows data to be sequentially stored in independent zones within a Zoned Storage device based on usage and access frequency of the data. This reduces the need to constantly arrange and rearrange data and minimizes write amplification issues.

As discussed in the background section, the Zoned Storage devices have some limitations and one such limitation is handling data read-write operations across multiple Zoned Storage devices. For example, currently the Zoned Storage devices have a restriction of zone copy or data copy within a single zoned storage device. However, sometimes a scattering of data across multiple zoned storage devices is desirable, which is not possible in current Zoned Storage devices. For example, to avoid data loss due to failure of a single storage device, it is desirable to scatter data across multiple zoned storage devices.

Due to the above-mentioned challenges, extended zone copy or handling data read-write operations across multiple zoned storage devices is still regarded as a complex problem and it is desirable to develop an effective technique which can facilitate efficient zone copy across multiple zoned storage devices in a data center facility.

To overcome these and other problems, the present disclosure proposes drive to drive data transfer techniques for efficient and high-performance zoned storage devices. In the present disclosure, new commands and communication methods are disclosed to enable drive to drive data transfer in a ZNS environment. The drive to drive communication has been pursued by means of various other standards as well. However, the present disclosure discloses techniques for drive to drive data transfer when a host is the master managing the zoned storage devices. In the environment depicted in the present disclosure, the host is the master who controls data placement and data movement operations. In such environment, the proposed techniques can be used to enable efficient drive to drive data transfer within an enclosure that helps the host to pick a destination zone from a large pool of zones across multiple destination zoned drives instead of being constrained to zones within a single zoned drive.

FIG. 1A illustrates an exemplary storage system 100 for performing a data read-write operation across zoned storage devices, in accordance with some embodiments of the present disclosure. The storage system 100 may comprise a master server or host 110 which may be in communication with at least one storage cluster 160 via at least one network 120. The host 110 may be a server, a controller, a personal computer, a laptop, an electronic device, a network device (e.g., switch, router), or the like. Though in FIG. 1A, for simplicity and consistency, only one host is shown, those of ordinary skill in the art will appreciate that the disclosed storage system 100 may comprise a plurality of hosts in communication with the at least one storage cluster 160. In the present disclosure, the host 110 is the master who controls data placement and data movement operations.

The storage system 100 and/or the storage cluster 160 may be a part of a data center facility. In general, a storage enclosure is a specialized casing designed to hold and power disk drives while providing a mechanism to allow them to communicate with one or more separate computing devices. In one non-limiting embodiment, each storage enclosure 130-1, 130-2 may comprise one or more storage arrays 150. In general, a storage array may comprise a plurality of non-volatile zoned storage devices capable of storing a huge amount of data. The storage array may have rows and columns. Each device in the storage array may be addressed using a row identifier and a column identifier.

In one non-limiting embodiment, the storage cluster 160 may comprise a plurality of storage enclosures 130-1, 130-2 (collectively referred to as 130). Each storage enclosure 130 may comprise a storage controller 140 and a storage array 150. Particularly, the enclosure 130 may contain a motherboard with multiple Network interface cards (NICs) for receiving data and/or commands from the host 110.

The network 120 may comprise a data network such as, but not restricted to, the Internet, a Local Area Network (LAN), a Wide Area Network (WAN), a Metropolitan Area Network (MAN), etc. In certain embodiments, the network 120 may include a wireless network, such as, but not restricted to, a cellular network and may employ various technologies including Enhanced Data rates for Global Evolution (EDGE), General Packet Radio Service (GPRS), Global System for Mobile Communications (GSM), Internet protocol Multimedia Subsystem (IMS), Universal Mobile Telecommunications System (UMTS) etc. In one embodiment, the network 120 may include or otherwise cover networks or subnetworks, each of which may include, for example, a wired or wireless data pathway. The network 120 may comprise servers, routers, bridges, switches, or other similar equipment used to facilitate communication between the host 110 and the storage cluster 160.

Figure 1B:
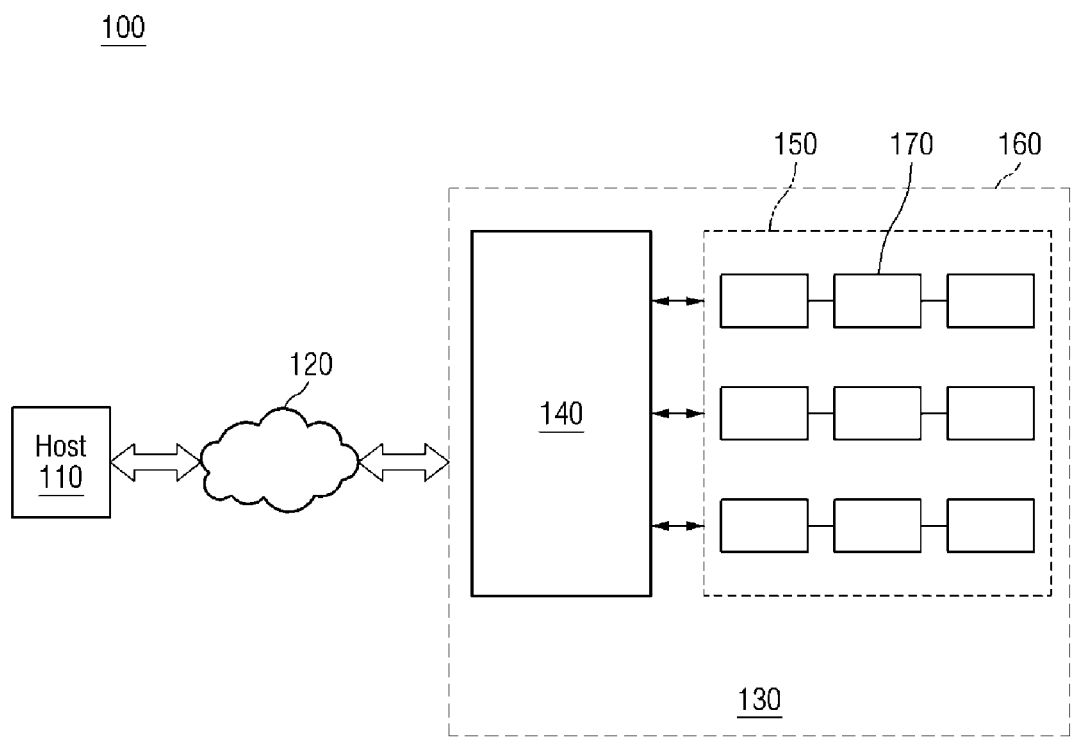
FIG. 1B shows a detailed block diagram of the exemplary storage system for performing data read-write operation across zoned storage devices, in accordance with some embodiments of the present disclosure.

FIG. 1B illustrates a detailed block diagram of the exemplary storage system 100 for performing data read-write operation across zoned storage devices, in accordance with some embodiments of the present disclosure. FIG. 1B illustrates that each storage enclosure 130 of the storage cluster 160 comprises a storage controller 140 and a storage array 150. The storage array 150 may comprise a plurality of zoned storage devices 170 arranged in the form of arrays. The zoned storage devices 170 may be connected to the host 110 through the storage controller 140 as shown in FIG. 1B, or the zoned storage devices 170 may be directly connected to the host 110. FIG. 1B shows that the storage array 150 comprises three rows of zoned storage devices 170, each row comprising three zoned storage devices 170. However, the present disclosure is not limited thereto and, in general, a storage array 150 may comprise multiple rows of zoned storage devices, each row comprising a plurality of zoned storage devices 170.

In one non-limiting embodiment, each zoned storage device 170 may be connected with the storage controller 140 via a bus. In one non-limiting embodiment, a storage controller 140 may refer to any hardware, device, component, element, or circuit configured to manage data operations on non-volatile memory media and may comprise one or more processors, programmable processors (e.g., FPGAs), ASICs, micro-controllers, or the like. In some embodiments, the storage controller 140 may be configured to store data on and/or read data from the non-volatile memory media, to transfer data to/from the non-volatile memory media, and so on.

Figure 2:
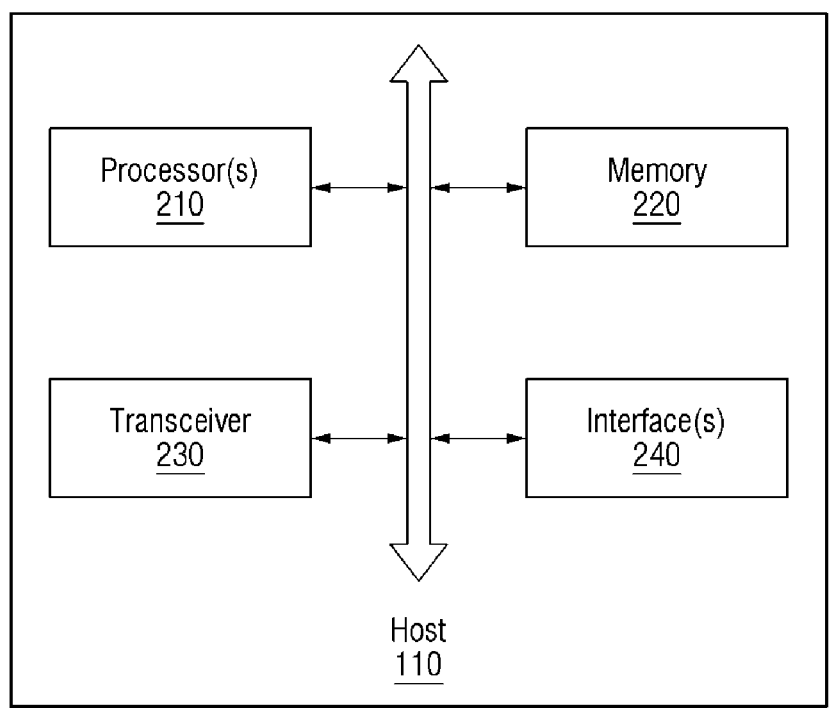
FIG. 2 shows a block diagram of a host, in accordance with some embodiments of the present disclosure.

FIG. 2 illustrates a block diagram 200 of a host 110, as illustrated in FIG. 1, in accordance with some embodiments of the present disclosure. The host 110 may comprise at least one processor 210, at least one memory 220, at least one transceiver 230, and at least one interface 240. The at least one processor 210 may be communicatively coupled with the memory 220, transceiver 230, and interface 240. The at least one processor 210 may be configured to perform various operations of the host 110.

Figure 3:
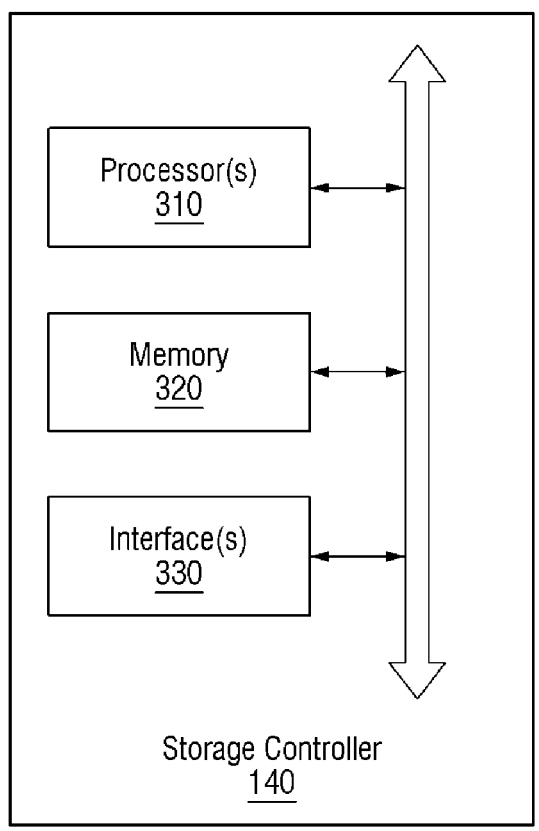
FIG. 3 shows a block diagram of a storage controller, in accordance with some embodiments of the present disclosure.

FIG. 3 illustrates a block diagram 300 of a storage controller 140, as illustrated in FIG. 1, in accordance with some embodiments of the present disclosure. The storage controller 140 may comprise at least one processor 310, at least one memory 320, and at least one interface 330. The at least one processor 310 may be communicatively coupled with the memory 320, and interface 330. In an embodiment, the storage controller 140 may also comprise at least one transceiver (not shown). The host 110 sends NVMe commands to these drives. The storage controller 140 may comprise controller firmware that performs enclosure management, network redundancy, controller fail over redundancy etc. The storage controller 140 may also provide other features like remote mirroring, backup over WAN, etc. The at least one processor 310 may be configured to perform various operations of the storage controller 140.

Figure 4:
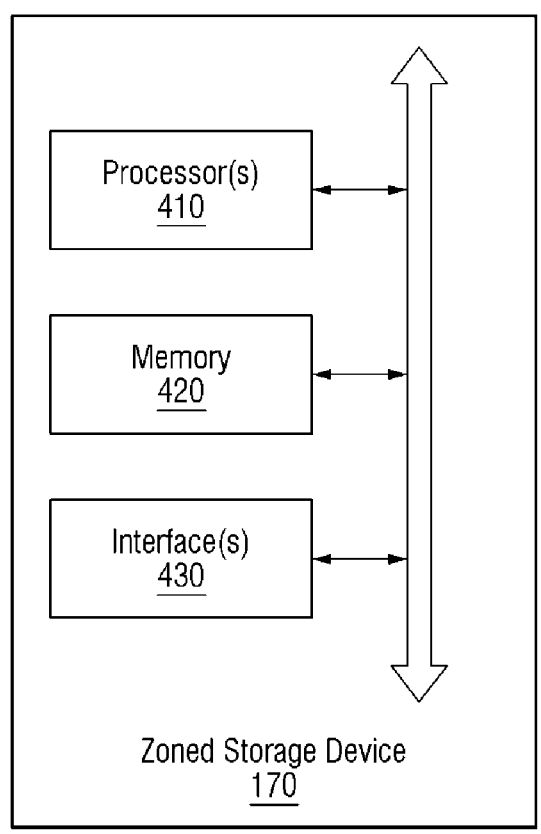
FIG. 4 shows a block diagram of a zoned storage device, in accordance with some embodiments of the present disclosure.

FIG. 4 illustrates a block diagram 400 of a zoned storage device 170, as illustrated in FIG. 1, in accordance with some embodiments of the present disclosure. The zoned storage device 170 may comprise at least one processor 410, at least one memory 420, and at least one interface 430. The at least one processor 410 may be communicatively coupled with the memory 420 and interface 430. The at least one processor 410 may be configured to perform various operations of a zoned storage device 170.

The processors 210, 310, 410 may include, but are not restricted to, a general-purpose processor, a Field Programmable Gate Array (FPGA), an Application Specific Integrated Circuit (ASIC), a Digital Signal Processor (DSP), microprocessors, microcomputers, micro-controllers, central processing units, state machines, logic circuitries, and/or any devices that manipulate signals based on operational instructions. A processor may also be implemented as a combination of computing devices, e.g., a combination of a DSP and a microprocessor, a plurality of microprocessors, one or more microprocessors in conjunction with a DSP core, or any other such configuration.

The memory 220, 320, 420 may be communicatively coupled to the processor 210, 310, 410 respectively. The memory 320 may include a Dynamic Random-Access Memory (RAM) unit which may further include a Host Memory Buffer (HMB) space. The memories 220, 320, 420 may include non-volatile memory units such as a Read Only Memory (ROM), a magnetic disc drive (e.g., HDD), a flash memory (e.g., SDD), and so forth. The storage space inside the memory 420 may be divided into a plurality of zones for storing data. The memories 220, 320, 420 may comprise various instructions executable by the processors 210, 310, 410.

The interfaces 240, 330, 430 may include a variety of software and hardware interfaces, for example, an input device-output device (I/O) interface, a network interface, and the like. The I/O interfaces may allow the host 110, the storage controller 140, and the storage devices 170 to interact with each other or with other computing devices directly or through other devices. The network interfaces may allow the host 110, the storage controller 140, and the storage devices 170 to interact with each other or with one or more other devices either directly or via a network (e.g., the network 120). The host interface 240 may include a web interface or a graphical user interface.

Figure 5:
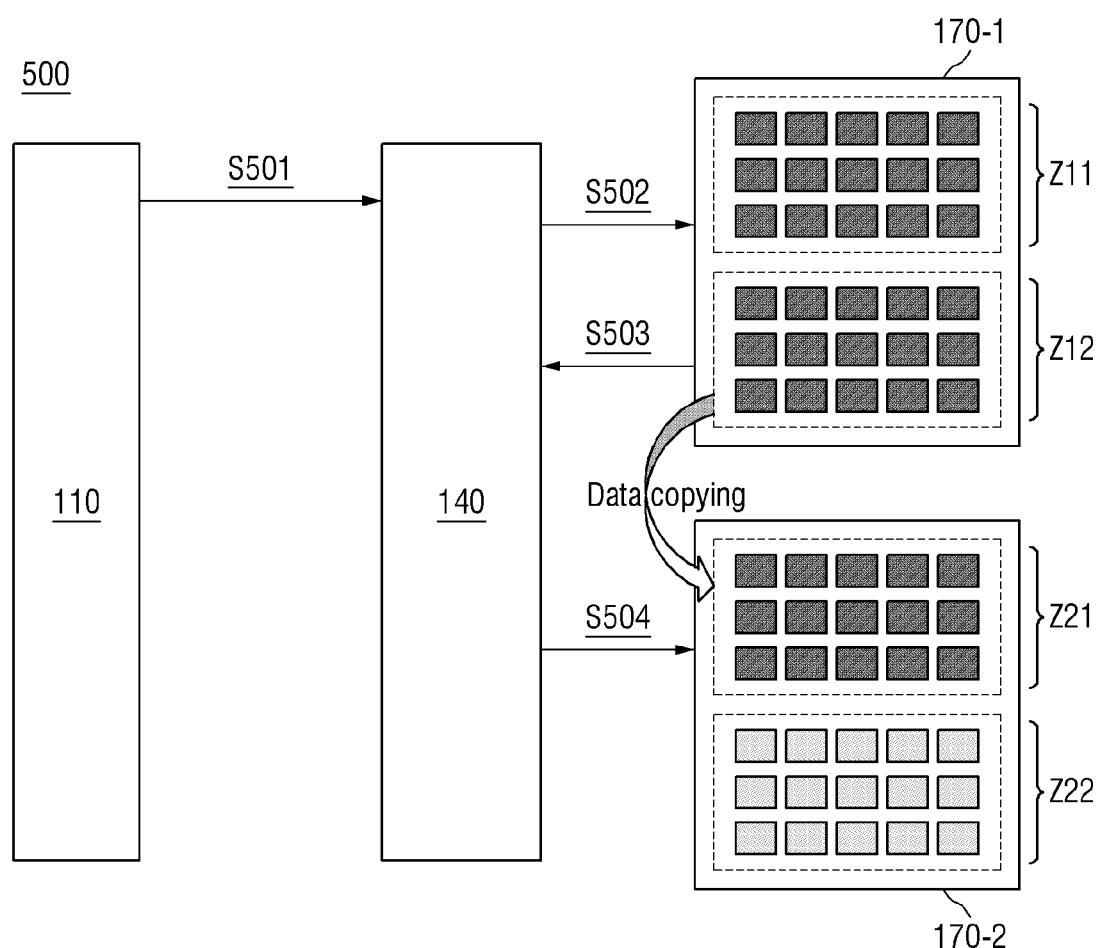
FIG. 5 shows an exemplary storage system showing a sequence of steps for performing data read-write operation across zoned storage devices, in accordance with some embodiments of the present disclosure.

FIG. 5 illustrates an exemplary storage system 500 showing a sequence of steps for performing a data read-write operation across zoned storage devices 170, in accordance with some embodiments of the present disclosure. The storage system 500 may be the same as the storage system 100 as illustrated in FIG. 1. The storage system 500 may comprise the host 110, the storage controller 140, and a plurality of zoned storage devices 170-1, 170-2. As described earlier, the storage space inside each zoned storage device 170 may be divided into a plurality of zones. For example, the storage space inside the zoned storage device 170-1 may be divided into two zones Z11 and Z12 and the storage space inside the zoned storage device 170-2 may be divided into two zones Z21 and Z22. The zoned storage device 170-1 may be named a "source zoned storage device" from which data is to be read, whereas the zoned storage device 170-2 may be named a "destination zoned storage device" into which the data (copied/read from the source zoned storage device) is to be written.

Since the host 110 is the master controlling the zoned storage devices 170, it is aware of zone size and zone configurations. The host 110 comprises a memory bitmap and updates it over time. The memory bitmap comprises information related to address locations of blocks and zones of the zoned storage devices 170 along with other information about the data present in the zoned storage devices 170. For instance, the memory bitmap may comprise information indicating whether a zone is empty or occupied or partially occupied, which blocks of a zone comprise valid data, which blocks of a zone are empty, and which blocks of a zone comprise invalid data. The memory bitmap is useful as it provides a way to keep track of memory inside the zoned storage devices 170 using only a little memory for the memory bitmap. Forthcoming paragraphs will describe the techniques of performing a read-write operation among at least one source zoned storage device 170-1 and at least one destination zoned storage device 170-2.

Initially, the host 110 prepares and sends a command called a 'ZNS Extended Copy' to the storage controller 140 (step S501). The command may perform a data read operation on at least one source zoned storage device 170-1 and then perform a data write operation on at least one other zoned storage device 170-2. The 'ZNS Extended Copy' command may comprise information including at least one source zone identifier with a corresponding validity bitmap, at least one destination zone identifier, and at least one encoding method.

In one non-limiting embodiment, the source zone identifier may comprise information about at least one source zone Z11, Z12 from which data is to be read from the at least one source zoned storage device 170-1. The destination zone identifier may comprise information about at least one destination zone Z21, Z22 of the at least one destination zoned storage device 170-2 into which the data (read from the at least one source zoned storage device 170-1) is to be written. It may be noted here that the at least one source zoned storage device 170-1 is different from the at least one destination zoned storage device 170-2.

In one non-limiting embodiment, the validity bitmap comprises information about the data which is to be read from the at least one source zoned storage device 170-1. The validity bitmap is a data structure which indicates validity of data present in the at least one source zoned storage device 170-1 (i.e., the validity bitmap may indicate which blocks of the at least one source zone Z11, Z12 comprise valid data). In one embodiment, the validity bitmap may also comprise information regarding the at least one destination zoned storage device 170-2 indicating which blocks and zones of the at least one destination zoned storage device 170-2 are available for new data. In summary, the validity bitmap helps in identifying the blocks and zones from where the data is to be copied and the blocks and zones into which the copied data is to be transferred. The validity bitmap may be created based on information present in the memory bitmap.

In one non-limiting embodiment, the storage controller 140 may receive the 'ZNS Extended Copy' command for performing the data read-write operation among a plurality of zoned storage devices 170-1, 170-2 (step S501). The storage controller 140 may decode or process the received command to extract the at least one source zone identifier and corresponding validity bitmaps, the encoding technique, and the at least one destination zone identifier. The storage controller 140 may translate the received 'ZNS Extended Copy' command into equivalent ZNS commands. For instance, the storage controller 140 may generate at least one zone read command and at least one zone write command based on information present in the 'ZNS Extended Copy' command. The storage controller 140 may send the at least one zone read command to the at least one corresponding source zoned storage device 170-1 for reading data from the at least one zone of the at least one source zoned storage device 170-1 (step S502). The data may be read at least based on the extracted source zone identifier and the validity bitmap (step S503).

In one non-limiting embodiment, the storage controller 140 may temporarily store the data being read from the at least one zone of the at least one source zoned storage device 170-1 into a dynamic random access memory (DRAM) of the storage controller 140. In general, a DRAM is a common type of random access memory (RAM) which enables faster access to data than the zoned storage devices 170. In one non-limiting embodiment, the storage controller 140 may perform encoding on the data read from the at least one source zoned storage device 170-1 based on the extracted encoding technique. The storage controller 140 may then use the at least one zone write command for writing the encoded data sequentially into at least one zone of the at least one destination zoned storage device 170-2 (step S504). The at least one zone write command may comprise information indicating the order in which data should be written into the at least one destination zoned storage device 170-2. Once the data is successfully written into the at least one destination zoned storage device 170-2, the DRAM may be freed.

It may be noted that when the destination zoned storage device 170-2 fails, the data stored in that device may be permanently lost. To prevent the loss of data because of such failures, the present disclosure may utilize erasure coding as the encoding technique. To implement the erasure coding, the storage controller 140 may split the data read from the at least one source zoned storage device 170-1 into a plurality of fragments (data fragments). The storage controller 140 may then create additional fragments (parity fragments). The number of parity fragments may correspond to the number of failures that a storage system can resist. For each parity fragment, the storage controller 140 may calculate a parity value based on the original data fragments. The data and parity fragments may then be stored across multiple destination zoned storage devices 170-2. In an embodiment, the storage system 500 may comprise a dedicated drive for storing the parity fragments. In case of failure of one or more destination zoned storage devices 170-2, the parity fragments can be used to rebuild the data fragments thereby preventing data loss. This way erasure coding lowers the risk of data loss due to drive failures.

In one non-limiting embodiment, the present disclosure discloses another technique of driver to drive data transfer with minimal involvement of storage controller 140. A Host Memory Buffer (HMB) of the storage controller 140 may be leveraged for the driver to drive data transfer. The first step is to bring data from the source zoned storage devices to the HMB of the storage controller 140, then the second step is to move the data to the destination zoned storage devices either after encoding or allow the destination zoned storage devices to perform the encoding. HMB is a feature of the NVMe protocol, which is the state-of-the-art storage interface for emerging storage devices such as SSDs. HMB enables the zoned storage devices 170 to make use of a portion of storage controller's memory 320 for caching address mapping information and/or user data. In other words, each zoned storage device 170 has access to some storage space of the storage controller. HMB enhances performance by utilizing the ample memory space 320 of storage controller 140 instead of a limited memory 420 of zoned storage device 170.

Figure 6:
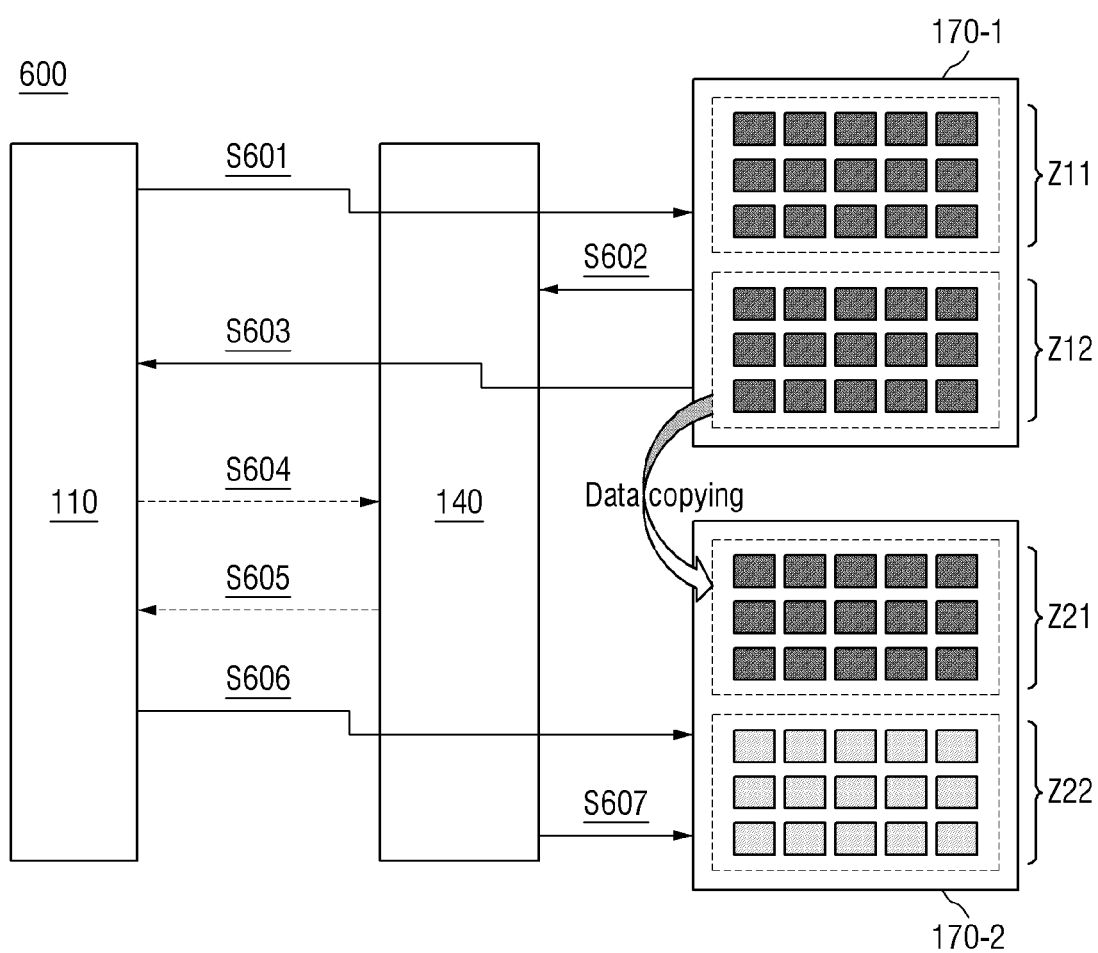
FIG. 6 shows an exemplary storage system showing a sequence of steps for performing data read-write operation across zoned storage devices, in accordance with some embodiments of the present disclosure.

FIG. 6 illustrates an exemplary storage system 600 showing a sequence of steps for performing data read-write operations across zoned storage devices, in accordance with some embodiments of the present disclosure. The storage system 600 may be the same as the storage system 500 and may comprise the host 110, the storage controller 140, and the plurality of zoned storage devices 170-1, 170-2 (i.e., the source zoned storage device 170-1 and the destination zoned storage device 170-2).

A new command called a 'ZNS Extended Copy Prepare' command is generated by the host 110. The host 110 sends at least one 'ZNS Extended Copy Prepare' command to at least one corresponding source zoned storage device 170-1 via the storage controller 140 (step S601). The at least one 'ZNS Extended Copy Prepare' command is for performing a data read operation on the at least one source zoned storage device 170-1. Each 'ZNS Extended Copy Prepare' command may comprise information indicating at least one source zone identifier corresponding to a source zoned storage device 170-1 and a corresponding validity bitmap.

In one non-limiting embodiment, the source zone identifier may comprise information about at least one source zone Z11, Z12 from which data is to be read from a source zoned storage device 170-1 of a plurality of zoned storage devices 170. In one non-limiting embodiment, the validity bitmap comprises information about the data which is to be read from the source zoned storage device 170-1. As described earlier, the validity bitmap is a data structure which indicates validity of data present in the source zoned storage device 170-1 (i.e., indicates which blocks of the at least one source zone Z11, Z12 comprise valid data). The validity bitmap helps in identifying the blocks from where the data is to be read.

In one non-limiting embodiment, the source zoned storage device 170-1 may receive the 'ZNS Extended Copy Prepare' command for performing the data read operation (step 601). The source zoned storage device 170-1 may decode or process the received command to extract the at least one source zone identifier and the corresponding validity bitmap. The source zoned storage device 170-1 may then read data according to the validity bitmap from the identified zones based on the received command. The data read from the source zoned storage device 170-1 may be temporarily stored in a memory space called a Host Memory Buffer (HMB) which comprises a plurality of addresses spaces for storing data (step S602). The source zoned storage device 170-1 may indicate the HMB addresses where the data is stored to the host 110 via the storage controller 140 (step S603). The steps S601, S602, and S603 may be repeated for each source zoned storage device from where data is to be copied.

Once all the source zoned storage devices indicate success for the data transfer to the HMB, the host 110 can generate at least one 'ZNS Extended Copy Commit' command for performing the data write operation on the at least one destination zoned storage device 170-2. The host may send the at least one 'ZNS Extended Copy Commit' command to the at least one corresponding destination zoned storage devices 170-2 via the storage controller 140. It may be noted that if there are N number of destination storage devices, then N corresponding 'ZNS Extended Copy Commit' commands may be generated, one for each destination storage device. A 'ZNS Extended Copy Commit' command may comprise information indicating at least one destination zone identifier and a plurality of HMB addresses storing the copied data. The destination zone identifier may comprise information about least one zone to which the data is to be written into the destination zoned storage device 170-2. The destination zoned storage device 170-2 may receive the corresponding 'ZNS Extended Copy Commit' command (step S606) and process the received command to extract the at least one destination zone identifier and the plurality of HMB addresses. The destination zoned storage device 170-2 may then perform a data write operation by reading the data from the plurality of HMB addresses and writing the read data sequentially to the identified zone of the destination zoned storage device 170-2 (step S607). In an embodiment, once the data is successfully written into the destination zoned storage device 170-2, the host 110 may send a notification to the source zoned storage device 170-1 to free the HMB buffer. The steps S606 and S607 may be repeated for each destination zoned storage device into which data is to be written.

In one non-limiting embodiment, the data read from the plurality of HMB addresses may be first encoded before writing into the identified zone of the destination zoned storage device 170-2. For instance, the 'ZNS Extended Copy Commit' command, received from the host 110, may further comprise information indicating at least one encoding technique. The destination zoned storage device 170-2 may process the received command to extract the at least one encoding technique for encoding the data being read from the HMB. The destination zoned storage device 170-2 may perform encoding on the data read from the HMB and write the encoded data sequentially to the identified zone of the destination zoned storage device 170-2 (step S607). The encoding technique may be an erasure encoding technique and may be utilized for retrieving missing data (i.e., the data being lost from the at least one zone of the destination zoned storage device after being written).

In another non-limiting embodiment, encoding may be performed by the storage controller 140. For instance, before transmitting the at least one 'ZNS Extended Copy Commit' command (i.e., step S606), the host 110 may transmit a data encoding command to the storage controller 140 (step S604). The command may comprise information indicating at least one encoding technique and the plurality of HMB addresses. The encoding technique may be the erasure encoding technique. The storage controller 140 may then perform erasure encoding on the data stored in the HMB based on the encoding technique and store the encoded data and parity information back into the HMB. The information indicating the HMB addresses which store the parity information and the encoded data may be transmitted to the host 110 (step S605). The host 110 may then generate the 'ZNS Extended Copy Commit' command for performing the data write operation on the at least one destination zoned storage device 170-2. The 'ZNS Extended Copy Commit' command may comprise information indicating at least one destination zone identifier and the plurality of HMB addresses corresponding to the encoded data and the parity information. The 'ZNS Extended Copy Commit' command may further comprise information indicating zone identifiers of a dedicated parity storage drive for storing the parity information. This way the data is transferred from the source zoned storage devices to the destination zoned storage devices.

The techniques of the present disclosure provide various technical advantages, such as a reduction in network congestion and faster compaction, leading to an increase in overall performance of the storage system. The storage system becomes robust since data need not be constrained to a single destination storage device. Multiple storage devices means the system storage is immune to even device level failures. Over time, the storage arrays may increase in size and volume; in such cases, the proposed techniques help in moving the data across ZNS drives efficiently.

It may be noted here that for the sake of simplicity, it is shown in FIGS. 5 and 6 that the data is read/copied from at least zone Z11, Z12 of a source zoned storage device 170-1 and written into at least one zone Z21, Z22 of the destination zoned storage devices 170-2. However, the present disclosure is not limited thereto and in general the techniques of the present disclosure are equally applicable for reading data from a plurality of zones of a plurality of source zoned storage devices and writing the read data into a plurality of zones of a plurality of destination zoned storage devices.

Zoned Storage technology becomes particularly useful in applications where the data once written on the storage devices rarely or never needs to be changed i.e., 'write once read many' scenarios (e.g., in data centers). Zoned storage devices are advantageous over conventional storage devices (e.g., SSDs) for supporting growing storage needs. For instance, since the data is stored sequentially in the ZNS SSDs in an organized manner, the overhead of garbage collection may be reduced. Hence, the over-provisioned space for garbage collection may not be needed and significant delays due to garbage collection can be reduced. Further, write amplification by garbage collection can also be eliminated, which will allow triple-level cell (TLC) or quad-level cell (QLC) SSDs with low endurance to proliferate. Therefore, the zoned storage devices provide more storage capacity and efficient read-write operations without sacrificing performance, endurance, or Quality of Service (QoS).

Figure 7:
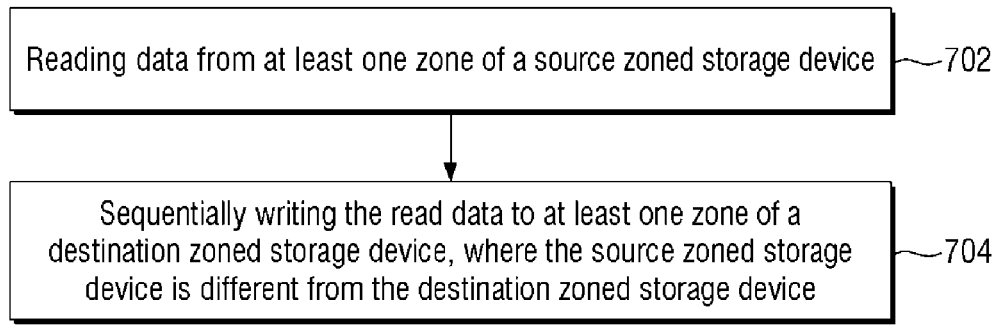
FIG. 7 depicts a flowchart illustrating a method for performing a data read-write operation across zoned storage devices, in accordance with some embodiments of the present disclosure.

FIG. 7 is a flowchart illustrating an exemplary method 700 for performing a data read-write operation in zoned storage devices, according to an embodiment of the present disclosure.

The method 700 may include, at block 702, reading data from at least one zone of a source zoned storage device 170-1. At block 704, the method 700 may include writing the read data sequentially to at least one zone of a destination zoned storage device 170-2. The source zoned storage device 170-1 may be different from the destination zoned storage device 170-2. In one embodiment, the operations of blocks 702 and 704 may be performed by the storage controller 140 (e.g., in the embodiment of FIG. 5) or by a host 110 in conjunction with the storage controller 140.

Figure 8:
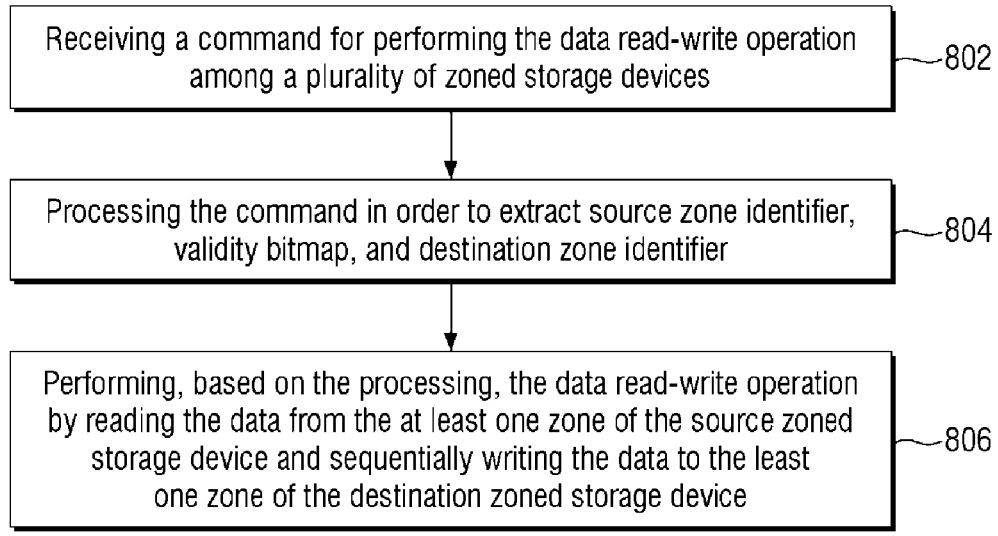
FIG. 8 depicts a flowchart illustrating another method for performing a data read-write operation across zoned storage devices, in accordance with some embodiments of the present disclosure.

FIG. 8 is a flowchart illustrating another exemplary method 800 for performing a data read-write operation among a plurality of zoned storage devices 170, according to an embodiment of the present disclosure. The various operations of method 800 may be implemented using the processor 310 of the storage controller 140.

The method 800 may include, at block 802, receiving a command for performing the data read-write operation among the plurality of zoned storage devices 170. For example, the processor 310 of the storage controller 140 may be configured to receive the command for performing the data read-write operation among the plurality of zoned storage devices 170.

In one non-limiting embodiment, the command for performing the data read-write operation may be received from a host server 110.

At block 804, the method 800 may include processing the command to extract a source zone identifier, validity bitmap, and destination zone identifier. For example, the processor 310 may be configured to process the received command to extract the source zone identifier, validity bitmap, and destination zone identifier.

In one non-limiting embodiment, the source zone identifier may comprise information about at least one zone from which data is to be read from a source zoned storage device 170-1 of the plurality of zoned storage devices 170. The validity bitmap may comprise information about the data which is to be read from the source zoned storage device 170-1. The destination zone identifier may comprise information about at least one zone to which the data is to be written, after being read, into a destination zoned storage device 170-2 of the plurality of zoned storage devices 170. The source zoned storage device 170-1 is different from the destination zoned storage device 170-2.

At block 806, the method 800 may include performing, based on the processing, the data read-write operation. For example, the processor 310 may be configured to perform the data read-write operation based on the processing. Performing the data read-write operation may comprise reading the data from the at least one zone of the source zoned storage device 170-1 and writing the data sequentially to the at least one zone of the destination zoned storage device 170-2.

In one non-limiting embodiment of the present disclosure, the processor 310 may initially temporarily store the data, being read from the at least one zone of the source zoned storage device 170-1, in a dynamic random access memory (DRAM) of a storage controller 140 in such a manner that the storage controller 140 is capable of writing the stored data into the at least one zone of the destination zoned storage device 170-2.

In one non-limiting embodiment of the present disclosure, the method 800 may comprise extracting at least one encoding technique for encoding the data being read from the at least one zone of the source zoned storage device 170-1 and writing the data, after encoding using the encoded technique, to the at least one zone of the destination zoned storage device 170-2. The at least one encoding technique may be further utilized for retrieving missing data, where the missing data is data lost from the at least one zone of the destination zoned storage device 170-2 after being written (e.g., in case of drive failures). For instance, the at least one encoding technique may be an erasure coding which may be utilized for retrieving missing data in case of drive failures.

FIG. 9 is a flowchart illustrating another exemplary method 900 for performing a data read-write operation in zoned storage devices by using two or more internal processors placed within the zoned storage devices, according to an embodiment of the present disclosure. The method may comprise providing a source side internal processor (or source device processor), locally within a source zoned storage device 170-1, and providing a destination side internal processor (or destination device processor), locally within a destination zoned storage device 170-2.

The method 900 may include, at block 902, receiving a first command for performing a data read operation on the source zoned storage device 170-1. For example, a processor of the source zoned storage device 170-1 may be configured to receive the first command for performing the data read operation on the source zoned storage device 170-1.

In one non-limiting embodiment, the command for performing the data read-write operation may be received from a host server 110.

At block 904, the method 900 may include processing the first command to extract a source zone identifier and validity bitmap. For example, the source device processor may be configured to process the first command to extract the source zone identifier and the validity bitmap.

In one non-limiting embodiment, the source zone identifier may comprise information about at least one zone from which data is to be read from the source zoned storage device and the validity bitmap may comprise information about the data which is to be read from the source zoned storage device.

At block 906, the method 900 may include performing, based on the processing, the data read operation by reading the data from the at least one zone of the source zoned storage device. For example, the source device processor may be configured to perform, based on the processing, the data read operation by reading the data from the at least one zone of the source zoned storage device 170-1.

At block 908, the method 900 may include writing the data, being read from the at least one zone of the source zoned storage device, into a Host Memory Buffer (HMB) of an external controller or storage controller 140. For example, the source device processor may be configured to write the data, being read from the at least one zone of the source zoned storage device 170-1, into the Host Memory Buffer (HMB) provided inside the external controller or the storage controller 140. The HMB may comprise a plurality of HMB addresses for storing the data.

At block 910, the method 900 may include transmitting the plurality of HMB addresses to the host 110. For example, the source device processor may be configured to transmit the plurality of HMB addresses to the host 110.

At block 912, the method 900 may include receiving a second command for performing a data write operation into a destination zoned storage device 170-2 which is different from the source zoned storage device 170-1. For example, a processor (destination device processor) of the destination storage device 170-2 may be configured to receive the second command for performing the data write operation in the destination zoned storage device 170-2.

At block 914, the method 900 may include processing the second command to extract a destination zone identifier and the plurality of HMB addresses. For example, the destination device processor may be configured to process the second command to extract the destination zone identifier and the plurality of HMB addresses. In an embodiment, the destination zone identifier may comprise information about at least one zone to which the data is to be written in the destination zoned storage device 170-2.

At block 916, the method 900 may include performing, based on the processing, a data write operation. For example, the destination device processor may be configured to perform the data write operation. Performing the data write operation may comprise reading the data from the plurality of HMB addresses and writing the read data sequentially to the at least one zone of the destination zoned storage device 170-2.

In one non-limiting embodiment of the present disclosure, the method 900 may comprise extracting at least one encoding technique for encoding the data being read from the HMB and writing the data, after encoding using the encoded technique, to the at least one zone of the destination zoned storage device 170-2. The at least one encoding technique may be further utilized for retrieving missing data, where the missing data is data lost from the at least one zone of the destination zoned storage device 170-2 after being written.

The above methods 700, 800, 900 may be described in the general context of computer executable instructions. Generally, computer executable instructions can include routines, programs, objects, components, data structures, procedures, modules, and functions, which perform specific functions or implement specific abstract data types.

The order in which the various operations of the methods are described is not intended to be construed as a limitation, and any number of the described method blocks can be combined in any order to implement the method. Additionally, individual blocks may be deleted from the methods without departing from the spirit and scope of the subject matter described herein. Furthermore, the methods can be implemented in any suitable hardware, software, firmware, or combination thereof.

The various operations of methods described above may be performed by any suitable means capable of performing the corresponding functions. The means may include various hardware and/or software component(s) and/or module(s), including, but not limited to the processors 210, 310, 410 of FIGS. 2-4 and the various other hardware components. Generally, where there are operations illustrated in Figures, those operations may have corresponding counterpart means-plus-function components.

It may be noted here that the subject matter of some or all embodiments described with reference to FIGS. 1-6 may be relevant for the method and the same is not repeated for the sake of brevity. Further, the present disclosure has been explained by considering the storage devices as ZNS SSDs. However, it may be noted that the teachings of the present disclosure are equally applicable for copying data among SMR HDDs.

In a non-limiting embodiment of the present disclosure, one or more non-transitory computer-readable media may be utilized for implementing the embodiments consistent with the present disclosure. Certain aspects may comprise a computer program product for performing the operations presented herein. For example, such a computer program product may comprise a computer readable media having instructions stored (and/or encoded) thereon, the instructions being executable by one or more processors to perform the operations described herein. For certain aspects, the computer program product may include packaging material.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/ or firmware.

I claim:

1. A method of performing a data read-write operation among a plurality of zoned storage devices by using an external controller, the method comprising:
receiving a command for performing the data read-write operation among the plurality of zoned storage devices, wherein the command comprises a source zone identifier corresponding to a validity bitmap, and wherein the validity bitmap indicates which blocks of at least one source zone has valid data;
processing the command to extract the source zone identifier, the validity bitmap, and a destination zone identifier, wherein:
the source zone identifier comprises information about the at least one source zone from which data is to be read from a source zoned storage device of the plurality of zoned storage devices,
the validity bitmap comprises information about the data which is to be read from the source zoned storage device,
the destination zone identifier comprises information about at least one zone in which the data is to be written, after being read, of a destination zoned storage device of the plurality of zoned storage devices, and
the source zoned storage device is different from the destination zoned storage device; and
performing, based on the processing, the data read-write operation by:
reading the data from the at least one source zone of the source zoned storage device, and
sequentially writing the data in the at least one zone of the destination zoned storage device.

2. The method of claim 1, further comprising receiving the command, for performing the data read-write operation among the plurality of zoned storage devices, from a host server.

3. The method of claim 1, further comprising temporarily storing the data, being read from the at least one source zone of the source zoned storage device, in a dynamic random access memory (DRAM) of the external controller such that the external controller is capable of writing the stored data in the at least one zone of the destination zoned storage device.

4. The method of claim 1, further comprising:
extracting at least one encoding technique for encoding the data being read from the at least one source zone of the source zoned storage device; and
writing the data, after being encoded, in the at least one zone of the destination zoned storage device, wherein the at least one encoding technique is further utilized for retrieving missing data, wherein the missing data is lost from the at least one zone of the destination zoned storage device after being written.

5. A method of performing a data read-write operation among a plurality of zoned storage devices, the method comprising:
providing a source device processor locally within a source zoned storage device for:
receiving a first command for performing a data read operation on the source zoned storage device, wherein the first command comprises a source zone identifier corresponding to a validity bitmap, and wherein the validity bitmap indicates which blocks of at least one source zone has valid data;
processing the first command to extract the source zone identifier and the validity bitmap, wherein:
the source zone identifier comprises information about the at least one source zone from which data is to be read from the source zoned storage device, and
the validity bitmap comprises information about the data which is to be read from the source zoned storage device;
performing, based on the processing, the data read operation by reading the data from the at least one source zone of the source zoned storage device;
writing the data, being read from the at least one source zone of the source zoned storage device, in a Host Memory Buffer (HMB), wherein the HMB comprises a plurality of HMB addresses for storing the data;
transmitting the plurality of HMB addresses to a host-server; and providing a destination device processor locally within a destination zoned storage device for:
receiving a second command for performing a data write operation in the destination zoned storage device, which is different from the source zoned storage device;
processing the second command to extract a destination zone identifier and the plurality of HMB addresses, wherein the destination zone identifier comprises information about at least one zone in which the data is to be written in the destination zoned storage device; and
performing, based on the processing, a data write operation by:
reading the data from the plurality of HMB addresses, and
sequentially writing the data, being read from the plurality of HMB addresses, in the at least one zone of the destination zoned storage device.

6. The method of claim 5, further comprising:
extracting at least one encoding technique for encoding the data being read from the HMB; and
writing the data, after being encoded, in the at least one zone of the destination zoned storage device, wherein the at least one encoding technique is further utilized for retrieving missing data, and
the missing data is lost from the at least one zone of the destination zoned storage device after being written.

7. An apparatus for performing a data read-write operation among a plurality of zoned storage devices, the apparatus comprising:
a memory; and
a processor communicatively coupled with the memory and configured to:
receive a command for performing the data read-write operation among the plurality of zoned storage devices, wherein the command comprises a source zone identifier corresponding to a validity bitmap, and wherein the validity bitmap comprises a data structure that indicates which blocks of at least one source zone has valid data;
process the command to extract the source zone identifier, the validity bitmap, and a destination zone identifier, wherein:
the source zone identifier comprises information about the at least one source zone from which data is to be read from a source zoned storage device of the plurality of zoned storage devices,
the validity bitmap comprises information about the data which is to be read from the source zoned storage device,
the destination zone identifier comprises information about at least one zone in which the data is to be written, after being read, of a destination zoned storage device of the plurality of zoned storage devices, and the source zoned storage device is different from the destination zoned storage device; and perform, based on the processing, the data read-write operation by:

reading the data from the at least one source zone of the source zoned storage device, and sequentially writing the data in the at least one zone of the destination zoned storage device.

8. The apparatus of claim 7, wherein the processor is configured to receive the command for performing the data read-write operation from a host server.

9. The apparatus of claim 7, wherein the processor is further configured to temporarily store the data, being read from the at least one source zone of the source zoned storage device, in a dynamic random access memory (DRAM) of the apparatus such that the processor is capable of writing the stored data in the at least one zone of the destination zoned storage device.

10. The apparatus of claim 7, wherein the processor is further configured to:

extract at least one encoding technique for encoding the data being read from the at least one source zone of the source zoned storage device; and write the data, after being encoded, in the at least one zone of the destination zoned storage device, wherein:

the at least one encoding technique is further utilized for retrieving missing data, and the missing data is lost from the at least one zone of the destination zoned storage device after being written.

\* \* \* \* \*